United States Patent
Shimakawa et al.

(10) Patent No.: US 6,452,644 B1
(45) Date of Patent: Sep. 17, 2002

(54) METHOD OF CONTROLLING RECEPTION IN DATA BROADCAST RECEIVER

(75) Inventors: Joji Shimakawa, Tokyo (JP); Alphonsius A. J. De Lange, Eindhoven (NL); Henricus A. W. Van Gestel, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

(21) Appl. No.: 09/230,937

(22) PCT Filed: Dec. 17, 1998

(86) PCT No.: PCT/IB98/00877

§ 371 (c)(1),
(2), (4) Date: Feb. 3, 1999

(87) PCT Pub. No.: WO98/57497

PCT Pub. Date: Dec. 17, 1998

(30) Foreign Application Priority Data

Jun. 11, 1997 (JP) .............................. 9-169529

(51) Int. Cl.$^7$ ................................. H04N 5/63
(52) U.S. Cl. ...................... 348/730; 348/725; 348/906; 348/569; 348/460; 348/461; 725/37; 725/131; 725/151
(58) Field of Search ................................. 348/730, 731, 348/733, 725, 726, 906, 569, 460, 461; 725/37, 39, 45, 46, 131, 132, 140, 151, 152; H04N 5/63

(56) References Cited

U.S. PATENT DOCUMENTS

| | | | | | |
|---|---|---|---|---|---|
| 4,600,948 A | * | 7/1986 | Dangschat | .................. | 348/730 |
| 5,410,369 A | * | 4/1995 | Nakajima | .................... | 348/730 |
| 5,617,146 A | * | 4/1997 | Duffield et al. | ............. | 348/460 |
| 5,619,274 A | * | 4/1997 | Roop et al. | ................. | 348/461 |
| 5,636,288 A | * | 6/1997 | Bonneville et al. | ........... | 363/79 |
| 5,659,366 A | * | 8/1997 | Kerman | ..................... | 348/468 |
| 5,659,367 A | * | 8/1997 | Yuen | .......................... | 348/465 |
| 5,710,605 A | * | 1/1998 | Nelson | ....................... | 348/734 |
| 5,734,589 A | * | 3/1998 | Kostreski et al. | ........... | 345/716 |
| 5,737,477 A | * | 4/1998 | Tsutsumi | .................... | 348/906 |
| 5,752,201 A | * | 5/1998 | Kivari | ........................ | 455/343 |
| 5,808,693 A | * | 9/1998 | Yamashita et al. | .......... | 345/211 |
| 5,808,694 A | * | 9/1998 | Usui et al. | .................. | 348/569 |
| 5,900,913 A | * | 5/1999 | Tults | .......................... | 348/468 |
| 6,252,634 B1 | * | 6/2001 | Yuen et al. | ................. | 348/478 |
| 6,271,893 B1 | * | 8/2001 | Kawaguchi et al. | ......... | 348/460 |
| 6,275,648 B1 | * | 8/2001 | Knudson et al. | ............ | 348/906 |
| 6,285,406 B1 | * | 9/2001 | Brusky | ....................... | 345/211 |

FOREIGN PATENT DOCUMENTS

| | | | |
|---|---|---|---|
| EP | 0751680 | * | 1/1997 |
| JP | 08288873 | * | 11/1996 |
| JP | 09289615 | * | 11/1997 |
| JP | 10178359 | * | 6/1998 |
| JP | 20001136453 | * | 5/2001 |
| WO | WO-9702702 | * | 1/1997 |

* cited by examiner

Primary Examiner—John Miller
Assistant Examiner—Linus H. Lo
(74) Attorney, Agent, or Firm—Edward W. Goodman

(57) ABSTRACT

The invention relates to the reception of data by a data broadcast receiver, particularly, a mobile data receiver for the Japanese TV data multibroadcast sound subcarrier system. The receiver is controlled to receive a desired type of data, for example, weather forecasts, news, stock prices, etc. The invention provides the transmission of time information which specifies, for each type of data, when the data will be transmitted or retransmitted. This allows the receiver to enter a standby mode in which the power consumption is reduced. On, or slightly before, the specified time, the receiver switches on to receive, decode and display the desired data. The invention is also applicable in television receivers having the facility to receive electronic program guides (EPG) or other services. The receiver is informed about the time at which an updated version of the EPG can be expected. In order to reduce power consumption in the receiver's standby mode, the hardware for receiving the EPG is not activated until the specified instant of time.

7 Claims, 2 Drawing Sheets

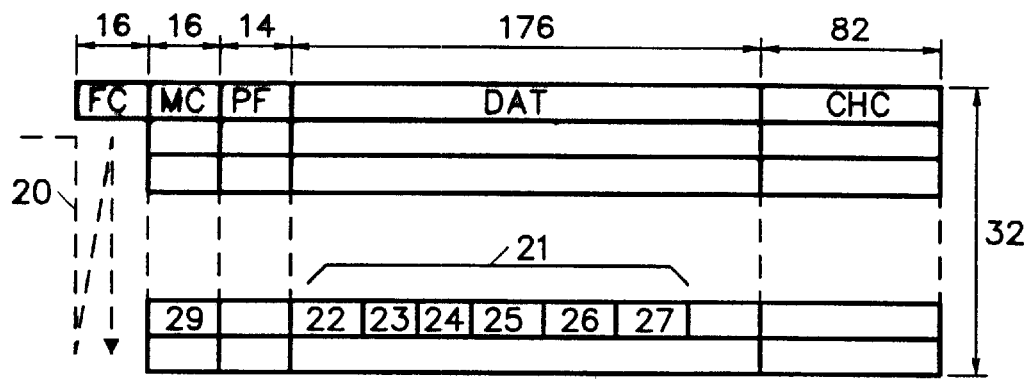
FIG. 1
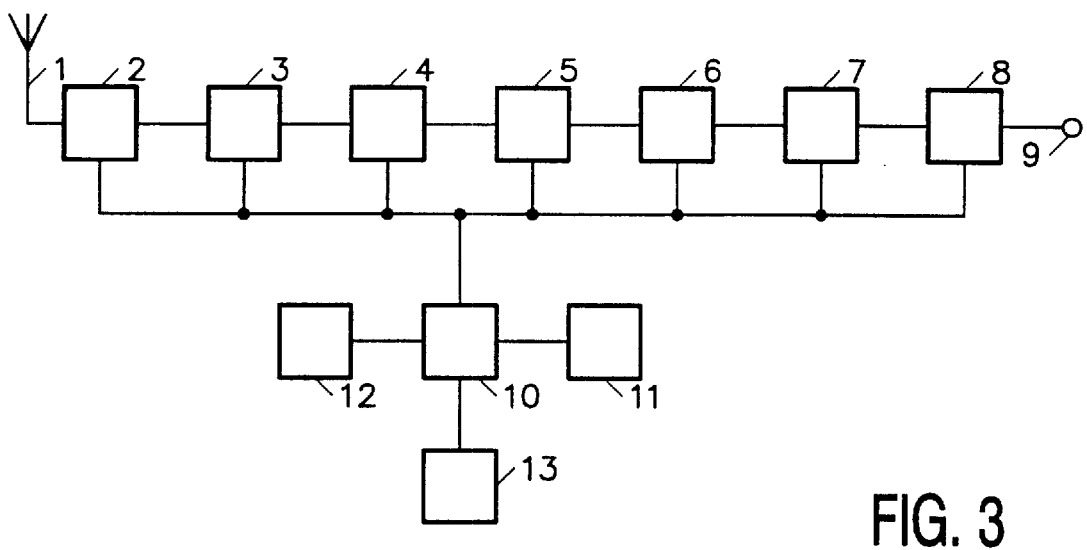
FIG. 2
FIG. 3
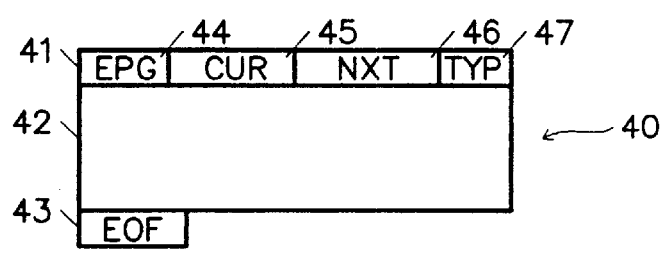
FIG. 4

METHOD OF CONTROLLING RECEPTION IN DATA BROADCAST RECEIVER

BACKGROUND OF THE INVENTION

1. Field of the Invention

The present invention relates to a method of controlling reception in a data broadcast receiver which receives a data broadcast of which data is transmitted in a frame comprising a plurality of packets and is interleaved at a same bit position in each packet and transmitted. The invention also relates to a method of broadcasting data to such receivers.

2. Description of the Related Art

A TV data broadcast system for enabling reception of a terrestrial data broadcast is currently being examined in Japan. The system allows data reception by mobile receivers and uses data signal subcarriers 4.5 fH and 7.5 fH (fH=15.73 kHz, the horizontal synchronizing pulse frequency) within a sound signal band of a television signal as the transmission path. The terrestrial data broadcast system provides programs such as:

Electronic mail service;

News, such as, newspapers, magazines, TV programs and others;

Vacancy information of concerts, movies, restaurants, hotels and others;

Information on time schedules, delays and vacancies of trains or buses;

Information on traffic jam, parking zones, gas stations, toilets, car shops and others;

Information on public facilities, hospitals, travel bureaus and others;

Information on shopping, such as, bargain sales and others;

Information on recreation and pleasures, such as, horse races, bicycle races and others;

Finance information, such as, stock prices and others;

Software, such as, MIDI data, games and others;

So-called narrow cast targeting on limited people in groups, companies, schools and others;

Information about disasters, such as, earthquakes, tidal waves, fires and others;

Play-by-play broadcasting of sports and others; and

Radio calling (pager).

However, the programs are not restricted to the above, and it can be considered that the programs will be further diversified in the future.

In the TV data broadcast system, the data is transmitted in the form of frames. One such a frame is shown in FIG. 1. The frame consists of total 9232 bits, including a 16-bit framing code or frame-sync (FC) and 32 data packets each having 288 bits. One data packet is made up of a 16-bit mode control (MC), a 14-bit prefix (PF), 176-bit service data (DAT) and a check code bit (CHC) for correcting errors.

In the TV data broadcast system, the data of all packets in the frame are interleaved with a depth of 32 in the vertical direction, as shown by the dashed arrow 20 in FIG. 1. That is, after transmitting the frame-sync signal FC, the most significant bit of the MC in the first packet is sent first, then the most significant bit of the MC of the second packet, etc. In the same manner, the second bit in the MC of the first packet is transmitted after the most significant bit of the MC in the 32nd packet. It is therefore necessary to receive all the data of the frame to which respective packets belong in order to decode the data of each packet.

The 16-bit MC comprises five significant information bits and eleven error correction bits. FIG. 2 shows the information bits b1–b5 of the MC currently defined in the TV data broadcast system, b1 being the most significant bit. Five broadcast services are defined at present.

In some of the above-mentioned data broadcast programs, the program broadcasting time or reception enabled time is restricted. Operation of the receiver in the time other than the rogram broadcast time greatly consumes power, thereby leading to disadvantages in the receiver for mobile reception, in particular. Manually operating the receiver is a troublesome operation.

SUMMARY OF THE INVENTION

It is an object of the present invention to provide, in the above-mentioned data broadcast, when receiving a program whose broadcasting time or reception enabled times is restricted, a method for controlling reception of a data broadcast receiver which can automatically minimize the ON time of the receiver for receiving the program.

To this end, according to a first aspect of the invention, a method for controlling reception in a data broadcast receiver which receives a data broadcast of which data is transmitted in a frame form consisting of a frame identification portion and a plurality of packets each consisting of at least a data portion and a broadcast identification portion transmitted prior to the data portion and of which data, except for that of the frame identification portion, is interleaved at a same bit position of each packet and transmitted, is characterized in that, under control of a control device, operations of the receiver are:

detecting a frame identification portion of a frame;

deinterleaving and decoding data in a broadcast identification portion when the frame synchronization has been acquired;

deinterleaving and decoding program identification data and time information data of reception control information included in a data portion when the decoded broadcast identification portion data has an identifier for identifying a reception control information broadcast;

entering a standby mode until the time specified from the time information data based on the decoded predetermined program identification data and the associated time information data; and entering a reception enabled mode when the specified time has come.

A second aspect of the invention is characterized in that the program identification data consists of program number data, service number data, broadcasting station identification data and/or broadcasting channel data, and the time information data consists of transmission time data, retransmission time data and/or intermittent transmission data.

A third aspect of the invention is characterized in that reception control of the receiver is carried out by gradually receiving the reception control information broadcast based on the category of program.

A fourth aspect of the invention is characterized in that if the receiver has identified the broadcast identification portion including an identifier of a time signal broadcast in a reception enabled mode, the receiver calibrates the time of an internal clock by using time information included in the data portion of the associated packet.

A fifth aspect of the invention is characterized in that the receiver again enters the reception enabled mode slightly earlier than the specified time.

BRIEF DESCRIPTION OF THE DRAWINGS

FIG. 1 is a view showing the frame structure in a TV data multibroadcast sound subcarrier system in accordance with the invention;

FIG. 2 is a view showing the information bits defined in the MC in the TV data multibroadcast sound subcarrier system;

FIG. 3 is a block diagram showing an example of a receiver for receiving a data broadcast in the TV data multibroadcast sound subcarrier system;

FIG. 4 shows a data format for transmitting an electronic program guide in accordance with the invention;

DESCRIPTION OF THE PREFERRED EMBODIMENTS

Figure 5:
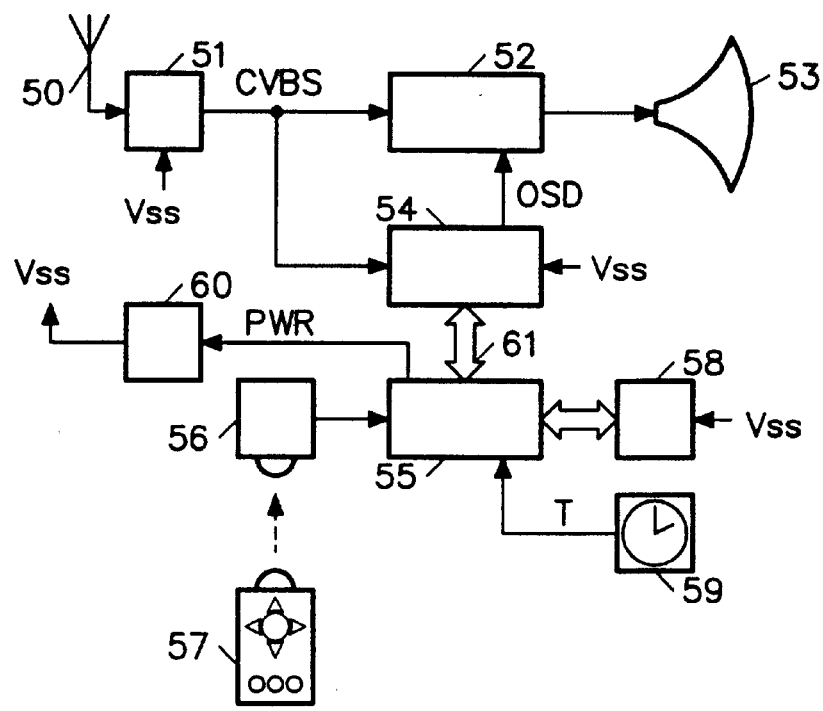
FIG. 5 shows, schematically, a television receiver for receiving and presenting the electronic program guide EPG data which are shown in FIG. 4.

The method according to the present invention will now be explained in detail in connection with a method for controlling data reception in a receiver targeting on reception of a program whose broadcasting time (or reception enabled time) is restricted.

As apparent from FIG. 2, in the TV data multibroadcast sound subcarrier system, five broadcasts are currently defined by respective MCs. According to the present invention, reception control information data is broadcast which specifies the broadcasting time of specific programs. As shown in FIG. 1, the reception control information data 21 is included in the data portion DAT, and an identifier 29 for identifying the presence of reception control information data is assigned to the MC of the data packet.

Any pattern may be used for identifying the reception control information broadcast as long as the MC is different than the five bit patterns shown in FIG. 2. That is, the identifier may be "10111", "10100" and the like.

The reception control information data 21 comprises, for example, a program number 22 (e.g., 16 bits), a service number 23 (e.g., 8 bits), a broadcasting station identification 24 (e.g., 12 bits), a broadcasting channel 25 (e.g., 10 bits), a transmission time 26 (e.g., 24 bits), and a retransmission time 27 (e.g., 16 bits) for each program. The transmission time data 26 indicates the time at which the program is broadcast and the retransmission time data 27 indicates the time at which the program, whose content is the same with that of the former program, is retransmitted. A multiplicity of retransmission times, e.g., the specification of retransmission time 1, retransmission time 2, etc., is possible. It is to be noted that the reception control information data for one program may be included in one data packet (DAT).

The present invention intends to perform the reception control of the receiver based on the reception control information obtained by the above-described reception control information broadcast. This control method will now be explained in detail.

FIG. 3 is a block diagram of an example of the receiver for receiving the data broadcast in the TV data multibroadcast sound subcarrier system. The receiver is provided with a tuner 2 for tuning a frequency of a sound signal in a television signal received through an antenna 1. An FM detecting portion 3 is connected to the tuner 2 for performing FM detection of the sound signal output. A filter portion 4, for obtaining data signal subcarriers 4.5 fH and 7.5 fH from the FM-detected signal, is connected to the FM detection portion 3. In the TV data multibroadcast sound subcarrier system, the data signal subcarrier is subjected to QPSK modulation. In view hereof, a QPSK demodulating portion 5, for demodulating the subcarrier, is connected to the filter portion 4. The QPSK demodulating portion 5 outputs frame data which has a frame configuration made up of a plurality of packets and is interleaved.

A framing portion 6, for detecting the framing code FC, is connected to the QPSK demodulating portion 5 to establish the frame synchronization of the frame data. The framing portion 6 is a coincidence circuit having a timer and a comparator, and counts a number of bits of the frame, i.e., 9232 bits upon recognizing the FC. The framing portion 6 is configured to detect that the next FC is input thereto based on the count. A deinterleave portion 7, for canceling the interleave of the data of the frame, is connected to the framing portion 6. A decoding portion 8, for decoding data of each packet of the frame which was subjected to the interleave cancellation, is connected to the deinterleave portion 8. The data decoded in the decoding portion 8 is supplied to an output 9 through a non-illustrated display apparatus or the like.

The operations of the tuner 2, the FM detecting portion 3, the filter portion 4, the QPSK demodulating portion 5, the framing portion 6, the deinterleave portion 7 and the decoding portion 8 are all controlled by a central processing unit (CPU) 10. A memory 11 and an internal clock 12 are further connected to the CPU 10. It is to be noted that a ROM 13, for storing information of the program identification data (the program number data, the service number data, the broadcasting station identification data, the broadcasting channel data and others) relating to a program receivable by the receiver, is also connected to the CPU 10.

When the power supply of the receiver is turned on, the respective elements constituting the receiver are all turned on, and the receiver enters the frame FC detection mode under control of the CPU 10. That is, the framing portion 6 detects the FC of a given frame. In case of frame synchronization, the frame data is subjected to interleave cancellation in the deinterleave portion 7, and the mode control portion MC of the packet of the frame is decoded in the decoding portion 8. If the mode control portion MC does not have the bit pattern which identifies the reception control information data, the decoding process is terminated and the respective elements remain in the ON state until the reception control information is received.

When the mode control portion MC has the bit pattern for identifying the reception control information broadcast, the decoding portion 8 decodes the data portion DAT of the packet. A table of reception control information is now created in memory 11. The CPU 10 compares the table with program identification data information stored in the ROM 13 which identifies a program to be received. When transmission of the program to be received is confirmed in the table and the transmission time of this program is extracted from the table, the receiver enters the standby mode until this time comes. In this manner, the operation of each element constituting the receiver is suppressed to the necessary minimum.

It is to be noted that the CPU 10 continues to operate in a power save mode in order to monitor the internal clock 12. When the above-described time is confirmed by the internal clock 12, each element of the receiver is turned on again under control of the CPU 10 to receive the predetermined data broadcast program. The time for reactivating each element is preferably slightly earlier than the stored time.

If, for some reason, no program is received at the specified time, the time at which the program is retransmitted is extracted from the retransmission time data in the associated reception control information data of the table so as to again try to receive the program. The operation of each element of the receiver is thus suppressed to a real minimum.

In this manner, the data broadcast reception of the receiver can be automatically controlled based on the reception control information, thereby achieving great reduction in the power consumption of the receiver.

It should further be noted that the reception control information data itself may be specified as a program, the program number identifying the reception control information broadcast. In this case, the transmission time and retransmission time(s) specify the next broadcasting time(s) of the reception control information data.

As another application, the data broadcast may include transmission of first reception control information identifying program categories as a first step, and second reception control information identifying a desired program among a plurality of programs in each category as a second step rather than individually identifying all the programs. In the first reception control information, the program number data specifies the first reception control information broadcast, the service number specifies a category, and the transmission time specifies the transmission time of the second reception control information broadcast relating to this category. In the second reception control information, the service number specifies the second reception control information in a given category, the program number identifies the program belonging to this category, and the transmission time specifies the transmission time of this program. Upon receiving the first reception control information broadcast, the receiver recognizes the transmission time of the second reception control information broadcast of a desired category from the service number data and the transmission time data in a desired reception control information data and enters the standby mode until the time comes. When the second reception control information broadcast time arrives, the receiver is reactivated and confirms the transmission time of the desired program from the reception control information data obtained by the second reception control information broadcast, again entering the standby mode until this transmission time comes.

It is important that the time of the receiver's internal clock 12 is precise, and it may be preferable that this time is calibrated by receiving a time signal broadcast when the receiver can receive a predetermined program. To this end, one MC pattern which is not equal to the identifier for reception control, for example, "10001" or "00001", may be assigned to a time signal broadcast which includes the current time in the data portion DAT of the packet.

As an alternative, the reception control information data may specify intermittent transmission data which specifies a broadcasting interval of the program rather than at a given time, for example, each hour or each day. The operation of the receiver is then controlled at intervals specified by the intermittent transmission data.

Further, in case of a pay broadcast for example, a personal ID of a subscriber may be set for receiving the program according to circumstances. In case of such a program, the reception control information data may include the data relating to the personal IDs.

The reception control information data may also include data relating to the end time of the program so that the receiver can again enter the standby mode based on the end time. In this case, the standby mode may continue until the associated retransmission time or until the transmission time specified by the reception control information of a desired program after again receiving this information.

The invention is not only applicable to mobile data receivers. Reduction of power consumption is also desired in the standby state of line voltage-powered equipment. For example, television receivers are known which are arranged to receive an electronic program guide (EPG) which is transmitted in a teletext-like manner. The EPG is transmitted only once, or a few times at most, each day. To receive the EPG, the relevant processing circuitry (tuner, teletext decoder, data memory) must be operative, even if the TV receiver is not used for watching a program. It is expected that international regulations will prohibit a power consumption of more than 1 Watt in the TV receiver's off-state or standby-state in the near future. This is unfeasible with present hardware circuits, particularly the TV tuner.

In accordance with the invention, the broadcaster includes in the transmission of EPG (or other types of data) the clock time at which the next transmission will take place. The television receiver then activates the relevant circuitry on, or just before, the specified time. In other words, the receiver switches from a real standby-state (in which the processor and the TV's real-time clock are active only) into a "datacast-standby" state in which the tuner, teletext decoder and data memory are activated for as long as the transmission takes place. Only in this "datacast-standby" state, the power consumption exceeds 1 Watt. Needless to say that all these operations are carried out without any intervention of the user.

The broadcaster may further indicate whether the data transmission is a repetition of a previously transmitted EPG or includes new information. In the first case, the receiver may conclude that the EPG has already been stored, and immediately switch to the normal standby state to further reduce power consumption. In the second case, the broadcaster may indicate whether the EPG is an incremental or completely new update. An incremental update may identify to which part of a previously transmitted EPG the update relates. This allows the TV to erase that part in memory.

FIG. 4 shows an example of a transmission format of an electronic program guide 40. The guide includes a header 41, a section 42 comprising a plurality of program items constituting the guide, and an end-of-file (EOF) marker 43. The header includes an identifier 44 (EPG) which specifies that the data 42 represents an electronic program guide, a parameter 45 (CUR) denoting the current clock time, a parameter 46 (NXT) which specifies the time at which the data will be transmitted again, and a parameter 47 (TYP) which specifies whether the EPG is merely a repetition of a previously transmitted version or a full or partial update thereof. The parameter 46 (NXT) may have various formats. It may specify the clock time at which the next transmission of the guide will take place ("tomorrow at 04.00 AM"), the time at which the guide will be transmitted cyclically ("each day at 04.00 AM and 01.00 PM"), or as an offset with respect to the current time ("this guide will be broadcast in 12 hours again").

FIG. 5 shows, schematically, a television receiver arranged to receive EPG data, and assemble the data from various channels so as to compose and display an overall TV guide covering all the channels that can be received, or are desired by the user. The receiver comprises an antenna 50, a tuner 51, a video decoder 52, a display screen 53, a data decoder 54 (usually, a teletext decoder), a control circuit 55 in the form of a microprocessor, a remote control receiver 56, a remote control transmitter 57, an EPG data memory 58, a real-time clock circuit 59, and a power supply 60.

The tuner receives a broadcast TV signal and demodulates it to obtain a composite video and blanking (baseband)

signal CVBS. The CVBS signal is processed (52) and displayed (53) in a further known manner. The CVBS signal is also applied to the teletext decoder 54. The teletext decoder comprises a data slicer (not shown) to extract the digital signal which is embedded in the vertical blanking interval of the CVBS signal and applies said data to the microprocessor 55 through a communication bus 61. The teletext decoder 54 also comprises a display generator (not shown) which receives an image to be displayed from the microprocessor 55 through the same bus 61. The image to be displayed is fed to the display screen 53 via the video processing circuit 52 as an On-Screen-Display signal OSD.

It will be appreciated that all the circuits of the TV receiver receive a power supply voltage in a normal operation mode. As generally known, the microprocessor 55 and the remote control receiver 56 receiver a power supply voltage also in a regular standby mode so that the receiver can be turned on in response to a remote control command. The standby power is further applied to the real-time clock 59 so that the microprocessor can read the current time in the standby mode.

The power supply 60 in FIG. 5 generates a power supply voltage Vss for the tuner 51, the teletext decoder 54, and the data memory 58, in response to a power control signal PWR from the processor 55. It is this signal which distinguishes between the regular standby mode as defined above and a "datacast standby" mode in which Vss is applied to the tuner 51, teletext decoder 54, and data memory 58.

Figure 6:
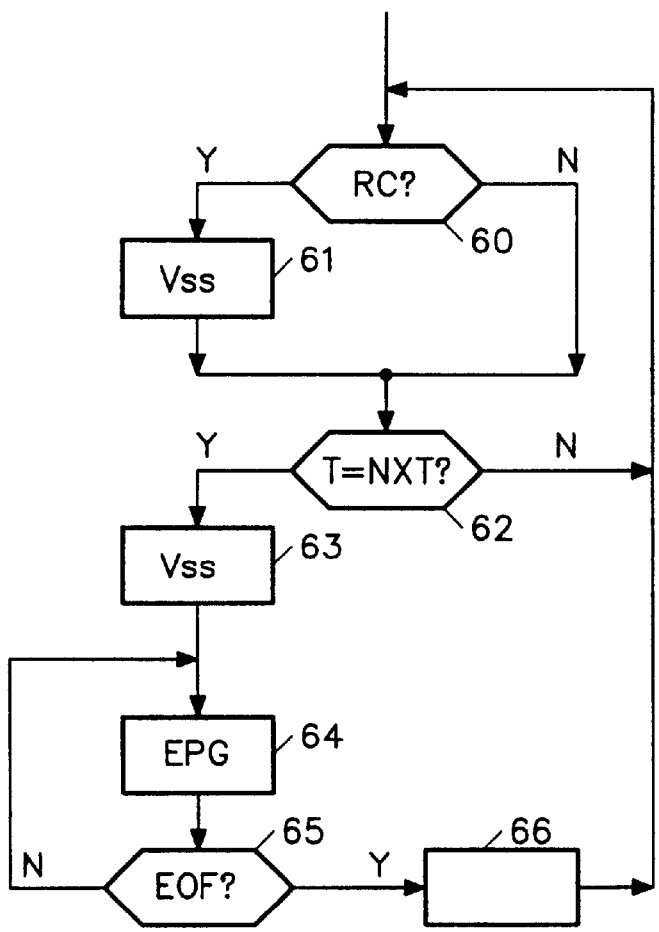
FIG. 6 shows a flowchart of operations which are carried out by a microprocessor which is shown in FIG. 5.

The operation of the receiver shown in FIG. 5 will now be described with reference to a flowchart of operations which is carried out by the microprocessor 55 and which is shown in FIG. 6. It will be assumed that the receiver is in the regular standby state and has already earlier received an electronic program guide as shown in FIG. 4. The guide is stored in data memory 58. The clock time at which the EPG will be transmitted again (the parameter NXT in FIG. 4) has been copied from memory 58 (the memory itself cannot be accessed in this mode) into a register of processor 55.

In a step 60, the processor checks whether a remote control command is received. If that is the case, the TV is switched on (which includes applying the power supply voltage Vss to the relevant circuits) in a step 61 and operates in a further known manner. In a step 62, the processor compares the current time T provided by the real-time clock circuit 59 with the time NXT at which the EPG is to be transmitted. As long as there is a predetermined large period of time to lapse until the EPG will be transmitted (e.g., more than half an hour), the processor returns to the step 60 already described above. In this manner, the TV remains in the normal standby state unless the receiver is turned on by the user.

If it has been found in the step 62 that an EPG transmission is due to be received, a step 63 is performed in which the microprocessor activates the power signal Vss so as to apply power to the tuner, teletext decoder and data memory (or, if the receiver was in the normal operation mode, to maintain supply of power even if the user switches the TV off). The TV is now in the "datacast standby" state. In a step 64, the EPG data is acquired and stored in the data memory 58. The parameter TYP (47 in FIG. 4) is hereby interpreted so as to distinguish which part of the already stored data is updated and can be removed from the memory.

Then, in a step 65, it is determined whether all transmitted EPG information has been processed. This is the case when the end-of-file marker EOF (43 in FIG. 4) has been encountered, or when the TYP parameter identifies that the received guide is the same as a previously transmitted and already stored version. As long as not all EPG information has been processed, the processor continuous with said processing in the step 64. Otherwise, a step 66 is performed in which the next time of transmission (specified by NXT and meanwhile stored in the data memory) is copied into the processor's register, and in which the processor refrains from further applying the power supply voltage Vss to the tuner, teletext decoder and data memory by deactivating the power control signal PWR.

In summary, the invention relates to the reception of data by a data broadcast receiver, particularly, a mobile data receiver for the Japanese TV data multibroadcast sound subcarrier system. The receiver is controlled to receive a desired type of data, for example, weather forecasts, news, stock prices, etc. The invention provides the transmission of time information which specifies, for each type of data, when said data will be transmitted or retransmitted. This allows the receiver to enter a standby mode in which the power consumption is reduced. On, or slightly before, the specified time, the receiver switches on to receive, decode and display the desired data.

The invention is also applicable in television receivers having the facility to receive electronic program guides (EPG) or other services. The receiver is informed about the time at which an updated version of the EPG can be expected. In order to reduce power consumption in the receiver's standby mode, the hardware for receiving the EPG is not activated until said specified instant of time.

What is claimed is:

1. A method of controlling reception in a data broadcast receiver which receives data transmitted as frames comprising a frame identification portion and a plurality of packets each comprising at least a data portion and a broadcast identification portion, characterized in that the method comprises the steps:

detecting the frame identification portion of a frame;

decoding data in the broadcast identification portion when the frame synchronization has been acquired;

decoding program identification data and time information data included in the data portion when the decoded broadcast identification portion data identifies a reception control information broadcast;

entering a standby mode until the time specified by the time information data associated with predetermined program identification data; and entering a reception enabled mode when the specified time has come.

2. The method as claimed in claim 1, characterized in that the program identification data comprises program number data, service number data, broadcasting station identification data and/or broadcasting channel data, and the time information data comprises transmission time data, retransmission time data and/or intermittent transmission data.

3. The method as claimed in claim 1, wherein the method further comprises the step:

gradually receiving the reception control information broadcast based on a program category.

4. The method as claimed in claim 1, wherein the method further comprises the step:

calibrating the time of an internal clock by using a time signal included in the data portion of the packet associated with the data portion.

5. The method as claimed in claim 1, wherein said step of entering the reception enabled mode is effected slightly earlier than the specified time.

6. A television receiver for receiving television signals including data signals representing an electronic program guide, said television receiver comprising:

receiving and decoding means for receiving and decoding said data signals;

a memory for storing said data signals;

processing means for processing said data signals and presenting the electronic program guide on a display screen; and a real-time clock circuit for generating a current time;

characterized in that said processing means comprises:

means for receiving a parameter identifying a next transmission time of said program guide;

means for comparing the current time with said next transmission time; and means for deactivating a power supply voltage to the receiving and decoding means in a standby state of the receiver until the current time substantially corresponds to the next transmission time.

7. The television receiver as claimed in claim 6, wherein the processing means further comprises:

means for receiving a parameter indicating whether the data signals represent an incremental or full update of a previously transmitted program guide; and means for replacing, in said memory, only the part of the guide corresponding with said update.

* * * * *